Patented Dec. 27, 1949

2,492,763

UNITED STATES PATENT OFFICE 2,492,763

AZOBIS (α-CYCLOALKYL-ACETONITRILES)

Paul Swithin Pinkney, Wilmington, Del., assignor to E. I. du Pont de Nemours & Company, Wilmington, Del., a corporation of Delaware No Drawing. Application October 30, 1946, Serial No. 706,813

2 Claims. (Cl. 260—144)

This invention relates to new alicyclic azo compounds and their use as polymerization catalysts.

The new compounds of this invention are tetra-substituted azodiacetonitriles having at least one alicyclic radical of 3 to 7 ring carbons directly attached to each alpha carbon. Another phase of the invention is the use of these compounds in the polymerization of polymerizable ethylenically unsaturated compounds.

The compounds of this invention are conveniently prepared by reacting an alicyclic ketone which has an alicyclic group adjacent to the carbonyl with hydrazine and hydrogen cyanide followed by mild oxidation suitably by halogen in the manner described below.

The following examples in which parts are by weight are illustrative of the invention.

Example I

The following solutions which were cooled to less than 15° C. were introduced into a reaction vessel in the order mentioned: 100 parts hydrazine hydrate in 600 parts water, 415 parts concentrated hydrochloric acid (containing 146 parts HCl), and 200 parts sodium cyanide dissolved in 700 parts water. To the above was added a cold (0–10° C.) solution of 336 parts of methyl cyclopropyl ketone and 390 parts of ethyl alcohol. The contents of the flask were stirred for 16 hours at 20° C. The oil which formed was separated and 195 parts of alcohol added to the oil. This solution was cooled to 0–5° C. and 1500 parts water and about 1600 parts concentrated hydrochloric acid added. A total of 270 parts of bromine was then added dropwise with stirring at 0–5° C. The solid was removed by filtration and recrystallized from petroleum ether. There was obtained 200 parts (46% of theory) of alpha,alpha'-azobis(alpha-cyclopropylpropionitrile) in the form of white crystals which melted with decomposition at 50–55° C. and had the following analysis: Found, C, 67.09 and 66.75; H, 7.62 and 7.71; N, 25.95 and 25.77. Calculated: C, 66.65; H, 7.04; N, 25.95.

Example II

Ten parts of hydrazine hydrate and 50.5 parts of cyclohexyl methyl ketone were placed in a reaction vessel. After refluxing for 6 hours, the vessel and contents were cooled. Upon cooling a solid formed. This was removed by filtration and was crystallized from aqueous ethyl alcohol. This product, cyclohexyl methyl ketazine, melted at 55° C. and was obtained in quantitative yield. In a pressure-resistant vessel was placed 37.2 parts of the cyclohexyl methyl ketazine and 54 parts of hydrogen cyanide. The vessel was closed and heated at 100° C. for 4 hours, after which the vessel was cooled and the hydrogen cyanide removed under reduced pressure. The oil thus obtained was placed in a flask and 75 parts water, 20 parts ethyl alcohol and 59 parts concentrated hydrochloric acid added. The solution was cooled to 0–10° C. and chlorine passed in until an excess was present. The solid product which formed was removed by filtration and crystallized from petroleum ether at −56° C. There was obtained 10 parts of alpha,alpha'-azobis(alpha-cyclohexylpropionitrile) which melted at 88–95° C. and had the following analysis. Found: C, 72.3; H, 9.6; N, 18.5. Calculated: C, 72.0; H, 9.3; N, 18.7. The compound was found effective in the polymerization of vinyl compounds.

Example III

A pressure reactor was charged with 20 parts of acrylonitrile, 0.1 part of catalyst, and 100 parts of cyclohexane. The air in the reactor was replaced with nitrogen and the reactor was closed and heated in a water bath for 4 hours at 40° C. The polyacrylonitrile formed was dried and weighed to determine the per cent conversion into polymer. Tabulated below are the catalysts and corresponding conversions. The table shows the relative catalytic activity of various catalysts at the temperature employed. The temperature of polymerization (40° C.) is lower than is usually employed in acrylonitrile polymerizations.

Table

| Catalyst | Conversion |
|---|---|
| | Percent |
| alpha,alpha'-Azobis(alpha-cyclopropylpropionitrile) | 85 |
| alpha,alpha'-Azobis(alpha-ethylbutyronitrile) | 0 |
| alpha,alpha'-Azobis(alpha-methylbutyronitrile) | 0 |
| alpha,alpha'-Azobis(alpha,beta-dimethylbutyronitrile) | 0 |
| alpha,alpha'-Azobis(alpha,alpha-dimethylvaleronitrile) | 27 |
| alpha,alpha'-Azodiisobutyronitrile | 0 |
| Dimethyl alpha,alpha'-azodiisobutyrate | 0 |
| 1,1'-Azobis(cyclohexanecarbonitrile) | 0 |
| Benzoyl peroxide | 0 |
| Lauroyl peroxide | 0 |

The unexpected superiority of speed of polymerization with alpha,alpha'-azobis(alpha-cyclopropylpropionitrile) is not restricted to the polymerization of acrylonitrile. The use of this catalyst for the polymerization of acrylates, such as methyl methacrylate, and for styrene gives outstanding results in quality of polymer and shortness of time. Addition polymerizations and copolymerizations of other polymerizable ethylenically unsaturated compounds are catalyzed with unusual speed by the azo compounds of this invention. The polymerizable compounds include not only compounds having but one ethylenic double bond, e. g., styrene, ethylene, tetrafluoroethylene, vinyl and vinylidene halides such as vinyl fluoride and vinylidene chloride, vinyl esters such as vinyl acetate, acrylyl compounds such as acrylonitrilem methyl acrylate, etc., but also compounds having two or more isolated ethylenic double bonds, e. g. the dimethacrylates of polyethylene glycols, diallyl diglycolate, diallyl carbonate, and diallyl phthalates. Polymerizable ethylenically unsaturated compounds having a $CH_2=C<$ group are particularly useful. Temperatures of from 20 to 80° C. are usually used in these polymerizations, although higher temperatures may be used to advantage with the azo compounds having 5–7 ring carbons.

The azo compounds of this invention may be represented by the formula

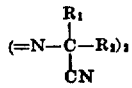

where $R_1$ is an alicyclic radical containing 3–7 ring carbons and $R_2$ is a lower hydrocarbon radical, i. e., of from one to seven carbon atoms, including aliphatic, alicyclic, and aromatic radicals. Usually $R_2$ is an alkyl radical of one to seven carbons (e. g. $C_nH_{2n+1}$ where $n$ is one to seven) such as methyl, ethyl, propyl, butyl, isoamyl, heptyl. The alicyclic radicals include cyclopropyl, cyclobutyl, cyclohexyl, cycloheptyl, methylcyclopentyl, etc. The alicyclic radicals have the general formula $C_nH_{2n-1}$ where $n$ is 3–7. Specific examples of such compounds are alpha,-alpha' - azobis(alpha - cyclopentylpropionitrile) and alpha,alpha' - azobis(alpha - cycloheptylpropionitrile).

In addition to the use of these azo compounds as addition polymerization catalysts, they may be used for the preparation of other compounds useful for synthetic work. For example, decomposition of the azo compounds under suitable conditions produces the dinitrile $$R_1R_2C(CN)C(CN)R_1R_2$$

Furthermore, nitrile groups of the azo compound can be converted to carboxylic ester or amide groups by reaction with alcoholic KOH followed by treatment with an alcohol or ammonia. The latter azo compounds are also useful catalysts.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A symmetrical azodiacetonitrile having on each of the carbons alpha to the azo group an alicyclic ring of 3 to 7 ring carbons, the fourth valence of said alpha carbon being satisfied by an alkyl radical of not more than seven carbons.

2. Azobis(alpha-cyclopropylpropionitrile).

PAUL SWITHIN PINKNEY.

REFERENCES CITED

The following references are of record in the file of this patent:

UNITED STATES PATENTS

| Number | Name | Date |
|---|---|---|
| 2,109,183 | Roose | Feb. 22, 1938 |
| 2,356,767 | Kropa | Aug. 29, 1944 |

OTHER REFERENCES

Beilstein: 4th edition, vol. 4, 1st supplement, page 566.

Hartman: Recueil des Travaux Chim., vol. 45 (1927), pages 150–153.